United States Patent
Hsieh et al.

(10) Patent No.: US 7,990,431 B2
(45) Date of Patent: Aug. 2, 2011

(54) CALCULATION METHOD FOR THE CORRECTION OF WHITE BALANCE

(75) Inventors: Wen-Hung Hsieh, Taichung (TW); Shu-Chen Hsiao, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 480 days.

(21) Appl. No.: 12/332,390

(22) Filed: Dec. 11, 2008

(65) Prior Publication Data

US 2009/0231463 A1    Sep. 17, 2009

(30) Foreign Application Priority Data

Mar. 14, 2008    (TW) ................. 97109124 A

(51) Int. Cl.
    *H04N 9/73*    (2006.01)
(52) U.S. Cl. ..................................... 348/224.1
(58) Field of Classification Search ............... 348/223.1, 348/224.1
    See application file for complete search history.

(56) References Cited

U.S. PATENT DOCUMENTS

| | | | |
|---|---|---|---|
| 2003/0030730 A1 | 2/2003 | Nakayama | |
| 2003/0156206 A1* | 8/2003 | Ikeda et al. | 348/223.1 |
| 2004/0075762 A1* | 4/2004 | Okubo | 348/371 |
| 2005/0128317 A1* | 6/2005 | Suzuki | 348/223.1 |
| 2007/0264000 A1* | 11/2007 | Hsieh et al. | 396/157 |

* cited by examiner

*Primary Examiner* — King Poon
*Assistant Examiner* — Fayez Bhuiyan
(74) *Attorney, Agent, or Firm* — Thomas|Kayden

(57) ABSTRACT

A calculation method for calculating a white balance correction value is disclosed. When an image capture device utilizes an auxiliary light to capture an image, the weightings of the image color impacted by the color temperature of each light source are obtained by the brightness-rate which is provided by the environment light and the flash, and then the weightings of the color temperatures of the two light sources are balanced to obtain a white balance correction value. At last, the white balance correction value is applied to correct the white balance of the image.

14 Claims, 3 Drawing Sheets

In the darkroom, obtain a default flashlight color temperature CT2 and a relationship table of the pulse width and the default brightness Obtain an environment color temperature CT1 and a first environment brightness Y1

Flash device uses a first pulse width P1 to flash light and an image capture device captures an image and obtains a second environment brightness Y2

Calculate a first flash brightness F1

Flash device uses a second pulse width P2 to flash light and an image capture device captures a third image Look up table to obtain a first default brightness R1 and a second default brightness R2 corresponding to the first pulse width P1 and second pulse width P2 respectively Calculate a second flash brightness F2

Calculate a white balance correction value WB

Output the image after performing a white balance correction

FIG. 1

| P | R |
|---|---|
| 10us | 100 |
| 11us | 110 |
| 12us | 120 |
| 13us | 130 |
| 18us | 180 |
| 19us | 190 |
| 20us | 200 |

FIG. 2

CALCULATION METHOD FOR THE CORRECTION OF WHITE BALANCE

CROSS REFERENCE TO RELATED APPLICATIONS

This Application claims priority of Taiwan Patent Application No. 97109124, filed on Mar. 14, 2008, the entirety of which is incorporated by reference herein.

BACKGROUND OF THE INVENTION

1. Field of the Invention

The disclosure relates generally to calculation methods for calculating white balance correction values, and, more particularly to calculation methods for calculating white balance correction values applied in an image capture device while using an auxiliary light for shooting pictures/capturing images.

2. Description of the Related Art

Charge-coupled devices (CCD) and Complementary Metal-Oxide Semiconductors (CMOS) have been widely used as image sensors in digital cameras in replace of conventional film. During picture shooting/image capturing, color accuracy determined by the image sensor for the image, may be impacted by the color temperatures of the lights coming from various light sources surrounding the image, as the brightness of the captured environment is provided by the surrounding lights intermixed with various light sources.

Typically, when capturing an image within a light source with lower color temperature value, image color for the captured image will slant toward the red color. Contrarily, the image color for the captured image will slant toward the blue color when capturing an image within a light source with higher color temperature value. Therefore, under light sources with different color temperature values, the image color for the captured image will be somewhat different from that of the actual object so that the color for the captured image should be corrected. Such correction process for correcting the image color is called a white balance process.

When capturing an image within an environment with low brightness, a flash is usually used to compensate for the lack of brightness. Methods for performing the white balance process using the flash, such as US publication No. 20030030730 A1, have already been disclosed. Meanwhile, US publication No. 20030030730 A1 provides a method for adjusting the white balance using the flash, in which, in the invention, a first control value is obtained based on the flash amount shot to the target object and the brightness before shooting. The first control value is applied to a default formula to obtain a second control value, and a white balance process for the image signals outputted by the image sensor is then performed according to the first control value and the second control value. However, the greater the color strength of the provided flash becomes, the larger the effect for color deviation.

Therefore, to overcome the aforementioned disadvantages, a calculation method for calculating the white balance correction values is provided by using the brightness weightings provided by the environment light and the auxiliary light when capturing the image so as to efficiently improve the color deviation effect caused by the auxiliary light source.

BRIEF SUMMARY OF THE INVENTION

It is therefore an objective to provide a calculation method for calculating a white balance correction value for correcting the color deviation impacted by adding an auxiliary light source.

In an embodiment, a calculation method for calculating a white balance correction value is disclosed. When an image capture device utilizes an auxiliary light to capture an image, the weightings of the image color impacted by the color temperature of each light source are obtained by the brightness-rate which is provided by the environment light and the flash, and then the weightings of the color temperatures of the two light sources are balanced to obtain a white balance correction value. Lastly, the white balance correction value is applied to correct the white balance of the image.

With the provided calculation method and white balance correction value, white balance of the image can be precisely performed under a capturing environment with low brightness even if the auxiliary light provides strong brightness compensation.

BRIEF DESCRIPTION OF THE DRAWINGS

The invention will become more fully understood by referring to the following detailed description with reference to the accompanying drawings, wherein:

FIG. 1 is a flowchart of an embodiment of a calculation method for calculating a white balance correction value of the invention;

FIG. 2 is a schematic diagram illustrating an embodiment of a relationship table of the pulse width and the default flash brightness of the invention.

DETAILED DESCRIPTION OF THE INVENTION

Figure 3:
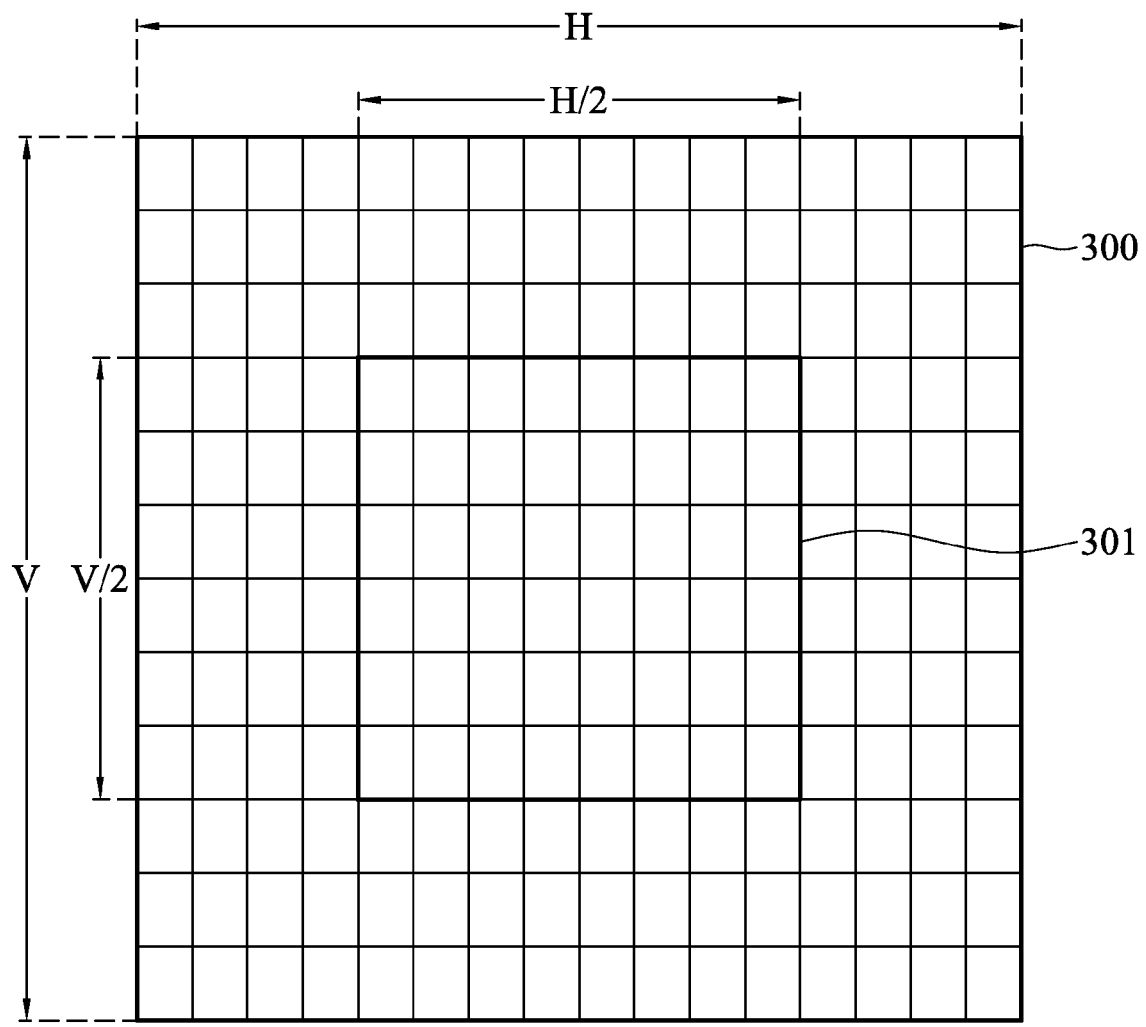
FIG. 3 is a schematic diagram illustrating an embodiment for forming the first image of the invention.

The following description is of the best-contemplated mode of carrying out the invention. This description is made for the purpose of illustrating the general principles of the invention and should not be taken in a limiting sense. The scope of the invention is best determined by reference to the appended claims.

Embodiments of the invention provide an image capture device that utilizes auxiliary light to compensate for the environment brightness so as to perform a white balance correction for the image, wherein the auxiliary light of the invention may be any device capable of emitting light such as a flash or an AF auxiliary light. In the invention, the flash is utilized as an example of the auxiliary light and detailed in below for brevity.

Please refer to FIG. 1. FIG. 1 is a flowchart of an embodiment of a calculation method for calculating a white balance correction value of the invention.

Step 1: first, a color temperature test of the flash is performed in a darkroom to obtain a default flash color temperature CT2 and another test, testing the pulse width (in unit of µs) corresponding to the default brightness of the flash is performed to obtain the default brightness of the flash, wherein the pulse width is a pulse width obtained by an image capture device detecting the environment brightness within the darkroom, to drive the flash device that is a device having the flash.

The color temperature test of the flash is performed by the image capture device that performs the image capture operation to a gray card in the darkroom and automatically adjusts the pulse width of the output voltage of the flash to drive the flash device to generate various default brightness of the flash corresponding to different pulse widths so as to perform a brightness compensation for the environment. At the same time, an image is captured by the image capture device and the RGB value of each pixel within a specific area of the captured image are summed and then averaged to generate a calculation result of an average summation thereof. The calculation result represents the RGB value of the default flash color temperature CT2 ($R_{CT2}$, $G_{CT2}$, $B_{CT2}$), and the RGB value representing the light intensity of each color of the three primary colors including a red (R) color, a green (G) color and a blue (B) color displayed by pixels within the image.

For example, if the color displayed by one of the pixels within the image is a red color, the light intensity of the RGB value (R, G, B) are assumed to be 255, 0, 0 for representing the light intensity of the red, the green and the blue colors for the RGB values, respectively.

In the test, wherein the pulse width corresponds to the default brightness of the flash, the pulse width (in unit of μs) is adjusted to generate a variation in the flash generated by the flash and each of the flashed images are then captured. The aforementioned method that is used for obtaining the flash color temperature CT2 is utilized for obtaining the RGB value of the $G_{CT2}$ value in each of the images which captured with using flash for representing the light brightness of each flash, which is further referred to as the default brightness R.

Thereafter, a relationship table of the pulse width (P) and the default brightness (R) is generated based on the test result for the test, testing the pulse width of the flash corresponding to the brightness, as shown in FIG. 2, and stored in the relationship table in the image capture device. In the relationship table, P field represents the pulse width while the R field represents the default brightness of the flash for each pulse width.

Definition for a specific area of the image and calculation step for averaging the summation of the color strengths of the RGB colors are detailed below.

Step 2: a first image 300 is captured in an environment without any flash and an average summation of the RGB value for each pixel within a specific area of the first image are calculated and the calculation result represents the RGB value of an environment color temperature CT1, represented by $R_{CT1}$, $G_{CT1}$, $B_{CT1}$, under the environment in which the RGB value of the $G_{CT1}$ value of the environment color temperature CT1 represents a first environment brightness Y1 that is brightness provided by the environment and the specific area comprises partial areas or entire areas of the first image.

The calculation method for obtaining the environment color temperature CT1 is illustrated in FIG. 3. FIG. 3 is a schematic diagram illustrating an embodiment for forming the first image of the invention. The first image 300 is formed by a pixel array that has H columns and V rows of pixels and a center area (H/2)×(V/2) of the first image 300 is set to be the specific area 301. Then, the average of the summation of the RGB value for each pixel within the specific area 301 of the first image 300 are calculated and the calculation result represents the environment color temperature CT1 in which the RGB value of the $G_{CT1}$ value of the environment color temperature CT1 is defined as the first environment brightness Y1.

For example, assume that the first image 300 has 1600× 1200 pixels, and coordinates of each pixel within the image is defined as pix(x, y), i.e. x is between 0 and 1599 and y is between 0 and 1199, wherein the x coordinate axis represents the column of the pixel while the y coordinate axis represents the row of the pixel. Each pixel represents one unit of the coordinates in which the farthest left and top point is set to be the original point pix(0,0) and the values of the x axis and the y axis are sequentially increased from left to right and from top to bottom, respectively. Particularly, pixels within the area that is the x coordinate between 400 and 1200 and y coordinate between 300 and −900 in the first image 300 are selected to be the specific area 301. It is understood that the specific area 301 can be selected based on the center of the first image 300, but it is not limited thereto.

It is assumed that the RGB value for each pixel within each position of the specific area 301 can be represented as following:

pix(400,300)=(200,150,100);
pix(401,300)=(199,150, 101);
pix(402,300)=(201,150,99);
pix(1200,898)=(201,150,99);
pix(1200,899)=(199,150,101); and
pix(1200,900)=(200,150,100).

Due to the specific area 301 having a total of (H/2)×(V/2) pixels, i.e. 800×600=4800 pixels, the calculation results of the average summation of the RGB value for each pixel within the specific area 301 can be represented as following:

$$\left( \frac{200+199+201+\ldots+201+199+200}{480000}, \right.$$
$$\frac{150+150+150+\ldots+150+150+150}{480000},$$
$$\left. \frac{100+101+99+\ldots+99+101+100}{480000} \right) = (200, 150, 100),$$

where 200,150,100 represents the environment color temperature CT1 in which: 200 represents the RGB value of the $R_{CT1}$ value of the environment color temperature CT1; 150 represents the RGB value of the $G_{CT1}$ value of the environment color temperature CT1; and 100 represents the RGB value of the $B_{CT1}$ value of the environment color temperature CT1. Since the $G_{CT1}$ value of the RGB value represents the first environment brightness Y1, the first environment brightness Y1 is set to be 150.

Step 3: in the same situation as in step 2, i.e. in an environment without any flash, the flash device is driven to flash a light by a first pulse width P1 for capturing a second image and a second environment brightness Y2 is obtained from the second image, wherein the first pulse width P1 may be any natural number in unit of μs.

Step 4: a first flash brightness F1 that is the flash brightness generated under the first pulse width P1 is obtained by subtracting the first environment brightness Y1 from the second environment brightness Y2.

Step 5: the image capture device drive the flash device with a second pulse width P2 to flash a light and to capture a third image that is the image of the target which is expected to be captured.

Step 6: please refer to FIG. 2, which is a relationship table of the pulse width and the default flash brightness of an embodiment of the invention. The pulse width field is compared with the first pulse width PI and the second pulse width P2 to obtain a first default flash brightness R1 and a second default flash brightness R2 of the flash corresponding to the default brightness from the values of the corresponding default brightness R field, respectively.

For example, if the first pulse width P1 is 20 μs and the second pulse width P2 is 19 μs, it can be obtained from the relationship shown in the relationship table of the FIG. 2 that the first default flash brightness R1 of the first pulse width P1 is 200 while the second default flash brightness R2 of the second pulse width P2 is 190.

Step 7: when the first pulse width P1 and the second pulse width P2 are applied in the darkroom, default flash brightness R1 and R2 will be generated so that the default brightness rate of the flash is R1/R2. Under the same pulse widths P1 and P2, the flash brightness for the flash while capturing the second image and the third image are F1 and F2 respectively, and thus the brightness rate of the flash is F1/F2. Since the default brightness R1 and R2 and the flash brightness F1 and F2 are generated by driven the flash device with the first pulse width P1 and the second pulse width P2, the relationship between default brightness rate and the flash brightness rate of the flash should be theoretically equaled. That is, $$\frac{R1}{R2} = \frac{F1}{F2}. \quad (1)$$

A second flash brightness formula is then derived from the formula (1):

$$F2 = \frac{R2}{R1} \times F1, \quad (2)$$

where R1, R2 and F3 are predefined numbers.

Step 8: the brightness rate of the image is defined by the light intensity of environment and the flash providing in capturing the third image in step 5 and are utilized to represent the weight of the image effect for the color temperatures of the two light sources, and thus the rate of the first environment brightness Y1 and the second flash brightness F2 is the brightness rate provided by the two light sources within the image. It is therefore known that the weight of the color temperature effect for the environment occupied in the image is $$\frac{CT1 \times Y1}{Y1 + F2}$$

and the weight of the color temperature effect for the flash occupied in the image is $$\frac{CT2 \times F2}{Y1 + F2}.$$

To balance the effect for the two color temperatures to the image color, the occupied weightings of the two color temperature effects are added together. The calculation result is the balanced result for the effect of the color temperatures of the two light sources and is represented as a white balance correction value WB. Therefore, a white balance correction value formula can be obtained as below:

$$WB = \frac{CT1 \times Y1 + CT2 \times F2}{Y1 + F2}. \quad (3)$$

Since the color temperatures of the light sources can be represented by the RGB value, the white balance correction value WB may comprise a white balance correction value of a red color $WB_R$, a white balance correction value of a green color $WB_G$ and a white balance correction value of a blue color $WB_B$. The white balance correction value of the red color $WB_R$ is used for the correction of the RGB value of the red color for the pixel, the white balance correction value of the green color $WB_G$ is used for the correction of the RGB value of the green color for the pixel and the white balance correction value of the blue color $WB_B$ is used for the correction of the RGB value of the blue color for the pixel. With three correction values, colors displayed by the pixels can be corrected such that the displayed color is closest to the actual color.

According to the RGB value of the environment color temperature CT1 and the default flash color temperature CT2 calculated by the formula (3), a white balance correction value calculation formula for the white balance correction value of the blue color $WB_R$, a white balance correction value calculation formula for the white balance correction value of the green color $WB_G$ and a white balance correction value calculation formula for the white balance correction value of the blue color $WB_B$ can be derived therefrom. The calculation formulas can be represented by following formulas:

$$WB_R = \frac{R_{CT1} \times Y1 + R_{CT2} \times F2}{Y1 + F2}; \quad (4)$$

$$WB_G = \frac{G_{CT1} \times Y1 + G_{CT2} \times F2}{Y1 + F2}; \text{ and} \quad (5)$$

$$WB_B = \frac{B_{CT1} \times Y1 + B_{CT2} \times F2}{Y1 + F2}. \quad (6)$$

Since the white balance correction value WB may comprise $WB_R$, $WB_G$ and $WB_B$, it can be represented as WB= $(WB_R, WB_G, WB_B)$. That is, $$WB = \begin{pmatrix} \frac{R_{CT1} \times Y1 + R_{CT2} \times F2}{Y1 + F2}, \\ \frac{G_{CT1} \times Y1 + G_{CT2} \times F2}{Y1 + F2}, \\ \frac{B_{CT1} \times Y1 + B_{CT2} \times F2}{Y1 + F2} \end{pmatrix}.$$

Step 9: the image capture device multiplies the RGB value for each pixel within the third image by the white balance correction value WB and the multiplication result is then divided by a number N for performing a normalization process in which different image capture devices have different number N. The result of the normalization process is utilized to replace the original RGB value of the image and then the image is outputted as the image which is a corrected image after the white balance correction has been completed.

The objective of the step 1 is to obtain the default information of the auxiliary light of the image capture device so as to provide the default information for white balance calculation for the same image capture device when it performs subsequent image capturing. Therefore, only steps 2 to 9 should be performed to correct the white balance for the captured image for the same image capture device to perform subsequent image capturing.

In summary, according to the calculation method of the invention, the weightings of the brightness provided by the environment light and the auxiliary light are utilized to calculate the white balance parameters for balancing the color deviation for the image caused by the color temperature of the auxiliary light, and thus the deviation effect caused by the color temperature can be improved due to the correction for the image colors by the white balance parameters under a darker environment with low brightness even if more color deviation effect may be caused by the auxiliary light that provides strong brightness compensation, thereby achieving a goal for white balancing of the image.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A calculation method for calculating a white balance correction value for use in an image capture device that stores a color temperature of a default auxiliary light CT2 and a relationship table of a pulse width P and a default brightness R, comprising:
   (A) under the same scene, capturing a first image and a second image having an auxiliary light, wherein a brightness of the auxiliary light is supplied with a first pulse width;
   (B) obtaining an environment color temperature CT1 and a first environment brightness Y1 from the first image;
   (C) obtaining a second environment brightness Y2 from the second image;
   (D) subtracting the first environment brightness Y1 from the second environment brightness Y2 to obtain a first flash brightness F1;
   (E) supplying the brightness of the auxiliary light with a second pulse width P2 to obtain a third image;
   (F) obtaining a first default flash brightness R1 and a second default flash brightness R2 by looking up the relationship table of the pulse width P and the default brightness R and calculating the second flash brightness F2 by a second flash brightness formula, wherein $$F2 = \frac{R2}{R1} \times F1; \text{ and}$$

(G) calculating a white balance correction value WB by a white balance correction value formula, wherein $$WB = \frac{CT1 \times Y1 + CT2 \times F2}{Y1 + F2}.$$

2. The calculation method of claim 1, wherein the environment color temperature CT1 and the first environment brightness Y1 are obtained from the RGB of pixels within a specific area of the first image.

3. The calculation method of claim 1, wherein the auxiliary light is a flash or an AF auxiliary light.

4. The calculation method of claim 1, wherein the RGB of the color temperature of the default auxiliary light CT2 are ($R_{CT2}$, $G_{CT2}$, $B_{CT2}$).

5. The calculation method of claim 1, wherein the RGB of the environment color temperature CT1 are ($R_{CT1}$, $G_{CT1}$, $B_{CT1}$).

6. The calculation method of claim 1, wherein the color temperature of the default auxiliary light CT2 is obtained by the image capture device performing an image capture operation to a gray card in a darkroom and driving an auxiliary light device to generate the auxiliary light to compensate for the brightness of the environment and capturing the image and performing an average calculation for a summation of the RGB value of each pixel within the specific area of the image to generate the default auxiliary light CT2.

7. The calculation method of claim 2, wherein the specific area comprises partial or entire areas of the first image.

8. The calculation method of claim 1, wherein the environment color temperature CT1 is obtained by a calculating result of averaging a summation of the RGB value of each pixel within the specific area of the first image.

9. The calculation method of claim 4, wherein the first environment brightness Y1 is represented by the RGB value of the $G_{CT1}$ value of the environment color temperature CT1.

10. The calculation method of claim 1, wherein the first default flash brightness R1 and the second default flash brightness R2 are respectively obtained by looking up the relationship table of the pulse width P and the default brightness R using the first pulse width P1 and the second pulse width P2.

11. The calculation method of claim 1, wherein the second flash brightness F2 is the brightness of the auxiliary light supplied during capturing the third image.

12. The calculation method of claim 1, wherein the white balance correction value WB further comprises the white balance correction value of a red color $WB_R$, the white balance correction value of a green color $WB_G$ and the white balance correction value of a blue color $WB_B$.

13. The calculation method of claim 12, wherein the white balance correction value formula further comprises:
    a white balance correction value formula of the red color:

$$WB_R = \frac{R_{CT1} \times Y1 + R_{CT2} \times F2}{Y1 + F2};$$

a white balance correction value formula of the green color:

$$WB_G = \frac{G_{CT1} \times Y1 + G_{CT2} \times F2}{Y1 + F2}; \text{ and}$$

a white balance correction value formula of the blue color:

$$WB_B = \frac{B_{CT1} \times Y1 + B_{CT2} \times F2}{Y1 + F2}.$$

14. The calculation method of claim 1, wherein the first environment brightness Y1 is represented by RGB value of the $G_{CT1}$ value of the environment color temperature CT1.

* * * * *